United States Patent [19]

Garff

[11] Patent Number: 4,691,895
[45] Date of Patent: Sep. 8, 1987

[54] FAUCET HANDLE ARRANGEMENT

[76] Inventor: Jeffrey L. Garff, 2586 W. 4700 South, #212, Salt Lake City, Utah 84118

[21] Appl. No.: 886,735

[22] Filed: Jul. 18, 1986

[51] Int. Cl.$^4$ ............................................. F16K 35/02
[52] U.S. Cl. .................................... 251/292; 251/77; 251/96; 403/348
[58] Field of Search .................... 251/77, 89, 96, 292; 464/901; 403/348, 349

[56] References Cited

U.S. PATENT DOCUMENTS

| | | | |
|---|---|---|---|
| 702,131 | 6/1902 | Green, Jr. ............................ | 251/292 |
| 992,502 | 5/1911 | Hollis .................................. | 251/292 |
| 1,162,935 | 12/1915 | Lange ............................... | 251/292 X |
| 2,110,135 | 3/1938 | Douglas .......................... | 403/348 X |
| 2,194,714 | 3/1940 | Mueller . | |
| 2,236,109 | 3/1941 | Mueller . | |
| 2,501,008 | 3/1950 | Schramm . | |
| 2,780,333 | 2/1957 | Reiser et al. . | |
| 2,829,538 | 4/1958 | Mueller . | |
| 3,193,243 | 7/1965 | Billington et al. . | |
| 3,210,040 | 10/1965 | Thurlow ............................ | 251/96 |
| 3,986,409 | 10/1976 | Tripp et al. . | |
| 4,549,716 | 10/1985 | Warren .............................. | 251/96 |

Primary Examiner—A. Michael Chambers
Assistant Examiner—John Fox
Attorney, Agent, or Firm—Trask, Britt & Rossa

[57] ABSTRACT

A handle for use in association with a fluid valve is disclosed. The handle includes a base member securely mounted to a spindle of the valve to be actuated. The base member includes at least one slot therein. A drive spindle having at least one hook-like extension fitted thereto is positioned in part within the base member. The hook extension is biased out of contact with the slot by a spring means. In operation, the user must depress the drive spindle thereby inserting the hook extension into the base member slot in order to activate the valve. The handle includes means of locking the drive spindle into an actuating contact with the base member.

10 Claims, 9 Drawing Figures

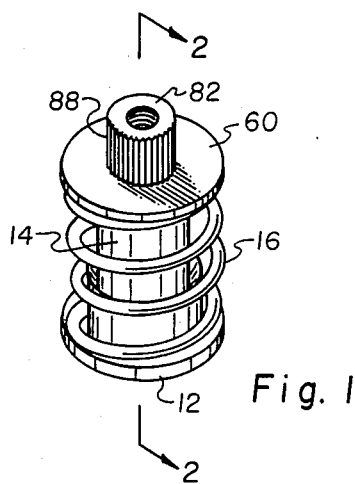
Fig. 1
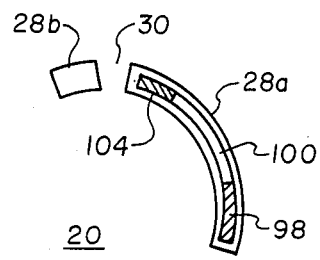
Fig. 8
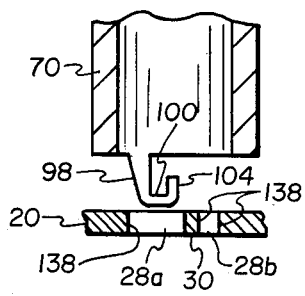
Fig. 3   Fig. 3a
  54       54
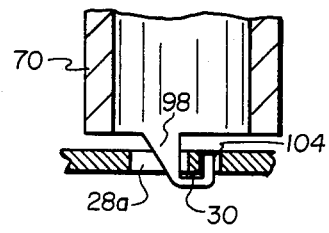
Fig. 5   Fig. 6
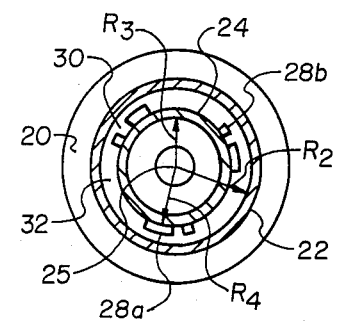
Fig. 4
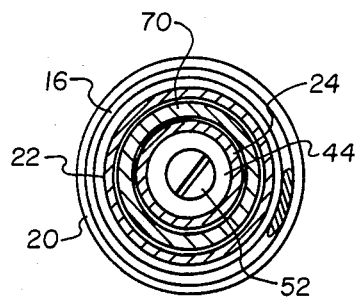
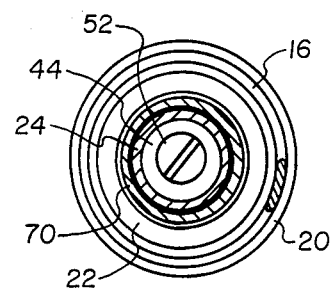
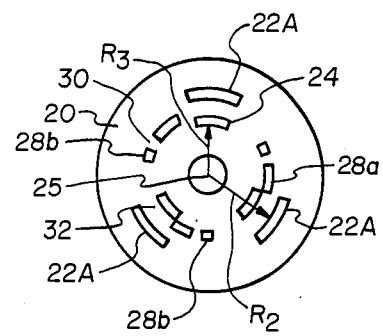
Fig. 7

FAUCET HANDLE ARRANGEMENT

BACKGROUND OF THE INVENTION

1. Field

This invention relates to handle arrangements for use in manipulating valves, especially those valves which control fluids such as water. More particularly, this invention is directed to a variety of handle arrangements which require two specific and distinct manual manipulations to be performed prior to the opening of the valve.

2. Prior Art

Various attempts have been made in the past to construct a valve handle arrangement which require a multi-step manual manipulation in order to operate the valve associated with the handle. A prime motivation for this multi-step requirement is to construct a handle which hinders the opening of the valve by small children. This motivation is especially compelling in the construction of valving systems which handle fluids whose accidental release through a valve may produce serious injury to the handler's operator. The most common fluid of concern in this area is hot, domestic culinary water.

One of the various past attempts in this area is that of Warner as disclosed in U.S. Pat. No. 4,549,716. Warner teaches the use of a core member which is fixedly mounted on the spindle of a subject valve. The core defines a hexagonally configured recess well on its upper surface. A hollow handle, which is graspable by the user, completely encloses the core. The handle is biased out of contact with the core by a spring mounted on the core's upper surface proximate the recess well. Fitted on the interior surface of the handle, opposite and above the recess well, is a hexagonal protrusion. The hexagonal protrusion is dimensioned and configured to be received within and mechanically cooperate with the recess well such that upon being received therein a user may apply a torque to the handle and thereby rotate the core and its attendant valve spindle to an open or closed position. In a rest position, the spring operates to retain the hexagonal protrusion out of contact with the recess well. In order for the handle to be properly operated, a user must first depress the handle against the action of the spring and thereafter apply a torque to the handle while retaining a depressing force against the handle. The Warner handle also includes a plurality of extensions proximate its lower surface which mechanically cooperate with those on the lower surface of the core to supplement the mechanical union of the hexagonal protrusion and the recess well. In essence, Warner describes a handle which includes a key member configured to be inserted into a recess well to form a positive connection between a manually manipulated handle and the valve spindle.

Other handle arrangements which detail various modifications of inserting a key-like member into a recess well are those described in U.S. Pat. No. 2,501,008 (Schramm); U.S. Pat. No. 3,270,040 (Thurlow); U.S. Pat. No. 3,986,409 (Tripp); and U.S. Pat. No. 2,780,333 (Reiser). A common denominator of each of these arrangements is the reliance on a spring to bias the key out of contact with a corresponding recess well. In each case, the user must depress the handle and overcome the resistive force of the spring before the handle can be actuated. While this characteristic is generally beneficial in a safety context in that it provides a handle which must be constantly depressed by the user during its actuation, it does have some drawbacks.

Upon each actuation, the user must align the key or keys with a proximate recess well. In most, if not all, of the devices disclosed, this alignment requires time. In some instances, perhaps a quarter turn of the knob is required. Since this alignment is done blindly since the keys and respective recess wells are hidden from view, its completion is a matter of trial and error.

In many situations, the user has initially opened the valve, released the handle and caused the fluid to flow. Thereafter, many times the user must adjust the valve to a proper setting. In the event the user is being contacted by the released fluid, which may be hot, the rapid and efficient adjustment of the valve assumes considerable importance. If the user is required to depress the handle and then by trial and error ascertain the location of the recess well or wells, significant discomfort, if not injury, may be resultant. This is especially the case with users whose manual dexterity or motor skills are less than average.

There exists a need for a handle which, at once, requires an initial multi-step manual manipulation in order to activate the valve, but which may be locked in place during use so as to permit ready adjustment of the valve without the complications of multi-step manipulation. Furthermore, a need exists for this handle to be readily returnable to its multi-step configuration with a minimum of effort to do so.

SUMMARY OF THE INVENTION

A multi-step manual manipulation handle of the instant invention includes a base member or connection means adapted for detachable mounting on the spindle portion of a fluid valve. The base member includes at least one slot therein which is fitted with a cross-bar or retention means. In preferred constructions, the base member includes at least one pair of extensions or clips which extend upright from a flat planar foundation panel. The foundation panel is typically fitted with the described slot or slots. The extension defines a channel therebetween.

A securement means, which in a preferred construction, is a flange which may be mounted on one of the extensions so as to extend into the channel.

A drive means or spindle is associated with the base member. Upon the mechanical connection of that drive spindle with the base member, a rotation of that drive spindle effectuates a corresponding rotation of the spindle of the valves. Stated in other words, a rotation of the drive spindle opens or closes the valve. In preferred embodiments, the drive spindle includes a mounting platform associated with a hollow tubular shaft dimensioned to be slidably received within the channel formed by the two foundation panel mounted extensions. The shaft is fitted with at least one, if not more, hook-like grasping means. This grasping means is configured and dimensioned to be slidably received within the slots of the base member. The hook-like shaping is adapted to be wrapped around the cross-bar or other retention means found within the slot to form a union. Due to the interaction of the hook-shaped grasping means and the cross-bar, their union is substantially secure against all force applications to the drive spindle, except those applied parallel to the axis of rotation of the spindle. The shaft generally includes a flange or other similar protrusion adapted to mechanically cooperate with the flange mounted on one of the foundation panel extensions. This mechanical cooperation functions to retain a portion of the drive spindle extension within the channel during the use of the handle.

A spring, or biasing means, is mounted between the base member and the drive spindle so as to bias one away from the other. The action of the spring is in part opposed by the mechanical interaction of the flanges mounted on the drive spindle and the base member.

The drive spindle may include an outer cover which may be detachably connected to the support platform and is configured to present a surface graspable by the user.

BRIEF DESCRIPTION OF THE DRAWINGS

FIG. 1 is an elevational perspective view of a base member, drive spindle, and spring assembly of the instant invention;

FIG. 3 is a cross-sectional side view of the assembly shown in FIG. 2 (along sectional lines 3—3) taken along a perspective rotated 90° from that of FIG. 2;

FIG. 3a is a cross-sectional side view of the assembly shown in FIG. 3, wherein the hook-like grasping means of the drive spindle are shown in its coupling configuration with a base member;

FIG. 4 is a cross-sectional top view of the assembly shown in FIG. 2 taken along section lines 4—4, wherein annular clips are employed;

FIG. 5 is a cross-sectional top view of the assembly shown in FIG. 2 taken along section lines 5—5;

FIG. 6 is a cross-sectional top view of the assembly shown in FIG. 2 taken along section lines 6—6;

FIG. 7 is a cross-sectional top view of the assembly shown in FIG. 2 taken along section lines 4—4, wherein segmented clips are employed;

FIG. 8 is a top view of a drive spindle hook of this invention.

DETAILED DESCRIPTION OF THE DRAWINGS

Figure 2:
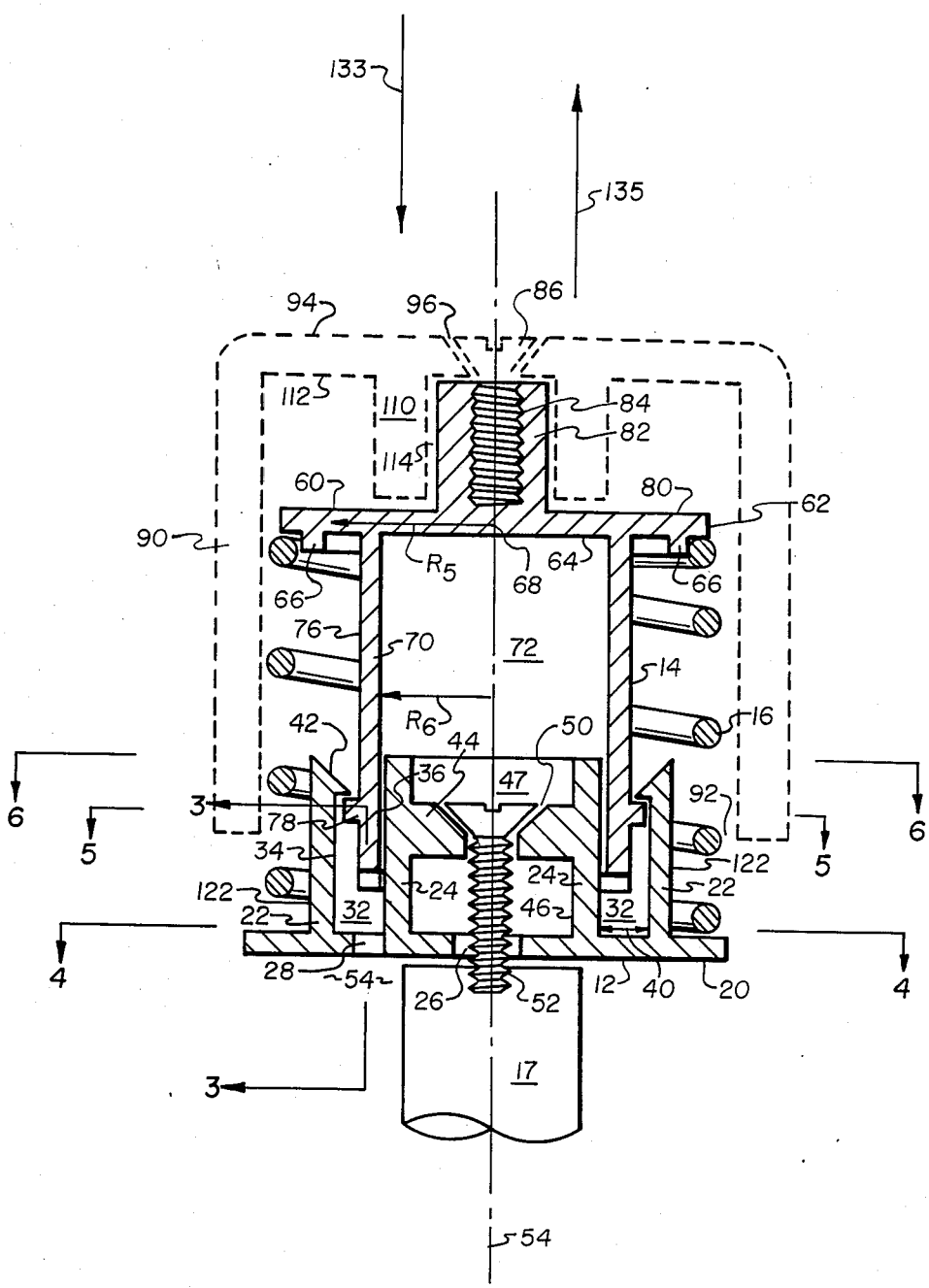
FIG. 2 is a cross-sectional side view of the assembly shown in FIG. 1 taken along sectional lines 2—2. A cover member adapted for placement over the assembly is shown in phantom.

A multi-step manual manipulation handle of the instant invention includes a base member generally 12, a drive spindle generally 14, and a spring-biasing member generally 16, in association with the spindle of a fluid valve 17.

As shown in FIGS. 1 and 2, a base member 12 may include a substantially planar disc-like platform 20 surmounted by a clip or plurality of clips 22 and an annular extension 24. Various configurations of clip 22 are within contemplation. In one embodiment (FIG. 4), the clip may be composed of an annular structure positioned upright on platform 20, i.e., clip 22 may be configured to be a hollow, open-ended cylinder. Alternatively, clip 22 may be configurated to be a plurality of upright members 22A positioned at spaced intervals about a circular path on the surface of platform 20 (FIG. 7). Extension 24 is concentrically positioned within clip 22. Expressed in other words, the clip 22 is positioned about the centroid 25 of base member 12 at a constant radius $R_2$ and the extension 24 is positioned about centroid 25 at a constant radius $R_3$. $R_2$ is dimensionally larger than $R_3$. In the case of the clip 22 being a plurality of upright members 22A, each of those upright members is positioned at a distance of $R_2$ from the centroid 25.

Throughout the remainder of this disclosure, the embodiment which includes an annular extension structure 22 will be described for purposes of detailing the invention. It should be understood that the embodiment which includes a plurality of upright members 22A defining the extension 22 is equally within contemplation throughout the disclosure. Further, whenever reference is made to components of the invention being oriented with respect to the annular structure of clip 22, it should be understood that the circular path upon which the upright member 22A is positioned corresponds to that annular structure for purposes of reference in determining component locations in those embodiments which utilize the upright members 22A.

Platform 20 may include a substantially circular circumference. As shown, the central region of the platform defines an aperture 26 which extends through the entire thickness of the platform 20. Positioned within the platform 20 are at least one, but preferably a plurality, of slots 28 which extend through the entire thickness of platform 20. As shown in FIG. 4, these slots are arranged in pairs along a substantially circular path about the surface of platform 20. This circular path is located between clip 22 and exterior 24. This circular path is positioned at a constant radius $R_4$ from centroid 25 of platform 20.

To place the orientation of the various components in perspective, the radii arranged in order of increasing length are $R_3$, $R_4$ and $R_2$.

The slots are of two configurations. A first slot 28a is generally arc-like in configuration. The slot has a width and is somewhat elongated. A second slot 28b is also generally arc-like in configuration but considerably shorter in length. Viewed in other terms, the slots 28 may be considered to be each composed of a single arc-like configured aperture having a width. The aperture has a cross-bar 30 or shaft which extends through the slot 28 so as to substantially define two slots, namely slots 28a and 28b. Under either perspective, the slots are each arranged about the center 25 of platform 20 at a common radial distance identified generally as $R_4$. As shown in FIG. 4, when viewing the slots 28 in a clockwise fashion, each smaller slot 28b is positioned ahead of its respective larger slot 28a.

Clip 22 is fixedly mounted to platform 20 along its edge. Extension 24 in being fixedly mounted on platform 20 so as to be substantially concentrically mounted with respect to clip 22 defines a channel 32 therebetween, i.e., the association of the interior sidewall 34 of clip 22 and the exterior sidewall 36 of extension 24 defines a channel 32 therebetween. The width 40 of channel 32 is preferably constant over the height of the channel.

Mounted on the top edge of clip 22 is a flange 42 which extends into the channel 32.

An annular ring 44 may be mounted on the interior sidewall 46 of extension 24 so as to extend into the interior 47 defined by that extension 24. Ring 44 defines an aperture 50, preferably located proximate the center of that ring and aligned with aperture 26. As shown in FIG. 2, apertures 50 and 26 are dimensioned to slidably receive a threaded bolt 52. Bolt 52 is adapted to be threaded into spindle 17, which spindle manipulates the fluid valve to be controlled. The bolt 52 is adapted to fixedly retain the base platform 20 securely against the spindle, such that a rotation of the platform results in a corresponding rotation of the spindle about an upright axis, generally 54. The aperture 50 may include an angulated or countersunk impression for receiving the angulated head of bolt 52. In mounting platform 20 to the spindle, the area 54 below slots 28 is retained free of any structure.

Drive spindle 14 includes a disc-like planar platform 60 which may have a substantially circular circumference or periphery 62. Mounted on the underside 64 of platform 60 is a lip 66, which may be substantially annular or ring-like in configuration. Preferably, the lip 66 is positioned at a constant radius $R_5$ from the center 68 of the platform 60.

A hollow tubular shaft 70 is fixedly mounted to the underside 64 of platform 60. As shown, shaft 70 may include an open-ended cylindrical body defining an interior channel 72. The shaft is positioned at a constant radius of $R_6$ from the center 68 of platform 60. As is readily apparent from the drawings, $R_6$ is dimensionally smaller than $R_5$.

The thickness of shaft 70 sidewalls is dimensionally smaller than the width of channel 32. As shown in FIG. 2, a portion of shaft 70 is inserted into channel 32 and made slidably reciprocal within that channel.

Mounted on the exterior sidewall surface 76 of shaft 70 is a flange 78. Flange 78 may be substantially annular in configuration. Flange 78 is positioned below flange 42 such that it may abut against flange 42 to prevent the retraction of shaft 70 from channel 32.

Positioned atop the upper surface 80 of platform 60 may be a mounting 82. As shown, mounting 82 may be a substantially hollow cylindrical structure defining an open-ended channel 84 therein. Channel 84 may be fitted with a female threaded socket, dimensioned to threadably receive a threaded bolt 86. The exterior surface of mounting 82 may be fitted with a plurality of outwardly radiating teeth 88.

As shown in FIG. 2, a cover member 90 may be positioned over the assembly. Cover member 90 is configured to present a surface which is graspable by the user, while at the same time the cover is adapted to be aesthetically pleasing. In a preferred embodiment, cover member 90 may be a hollow cylindrical member having an open end 92 dimensioned to fit over the assembly. An end panel 94 of the cylindrical cover member may include an aperture 96 which is aligned with channel 84 within mounting 80 when the cover is placed over the drive spindle 14.

The cover member 90 may be detachably mounted on mounting 80 by the threaded insertion of bolt 86 through aperture 96 and channel 84. The cover member 90 may include an annular extension 110 mounted on the interior end wall 112. The extension 110 defines an open-ended channel 114 which may be dimensioned to slidably receive and retain the toothed mounting 82. The interior wall 116 of extension 110 may also be fitted with a plurality of inwardly radiating teeth adapted to mesh with teeth 88 to form a mechanically cooperative union.

Fitted on the bottom edge of extension 70 is a plurality of "J"-shaped hooks 98. Hooks 98 define a receiving well 100 therein which is dimensioned to receive and retain cross-bar 30. The dimensions and configuration of hooks 98 are adapted to permit the insertion of each hook 98 through a respective slot 28; i.e., the length 102 of hook 98 is dimensioned to be less than the length of slot region 28a. The width of the hook is likewise dimensionally smaller than the width of slot regions 28a and 28b. When viewed from above or below, the hooks have a generally arc-like configuration which is adapted to correspond to the arc-shaped slots 28 (FIG. 8). The leg 104 of each hook 98 is dimensioned to be slidably received within slot region 28b.

A spring 16 is positioned to bias the drive spindle 14 away from the base member 12. As shown, spring 16 may be a conventional coil spring. The spring is dimensioned to permit a proximal end to be fitted about the outer surface wall 122 of clip 22 and rest against platform 20. The distal end of spring 16 is dimensioned to be fitted about retaining lip 66 and thereby retained against platform 60.

In operation, the cover member 80 is fitted on drive spindle 14 so as to be biased outward away from base member 12 by the action of spring 16. In the condition shown in FIG. 2, the hooks 98 are retained out of contact with slots 28. As a result, the drive spindle 14 may be rotated freely about axis 54 with no interaction or effect on the base member 12 or the spindle of the valve. To activate the handle, a user depresses the cover member 80 in the direction shown by arrow 133 against the resistive force of spring 16. The cover member 80 is rotated about axis 54 such that the hooks 98 are aligned with slots 28. Further depression of cover member 80 inserts the hooks 98 through respective slots 28a. Since the space 54 below slots 28 is retained free of structure, a portion of the hooks 98 pass through the slots 28. Thereafter, a counterclockwise rotation of cover member 80 positions each leg 104 in alignment with slot 28b. As the user continues to attempt to turn cover member 80, the hook 98 abuts against cross-bar 30.

The user then releases the cover member 80, at which point the spring 16 forces the drive spindle 14 in the direction shown by arrow 135. This displacement of the drive spindle results in legs 104 of hooks 98 being lodged in respective slots 28b; i.e., each cross-bar 30 is received within a respective receiving well 100. The cover member 80 may then be rotated about axis 54. As it is rotated, the surfaces of hooks 98 contact and abut against the walls 138 and cross-bars 30 of platform 20 which define slots 28. This abutment provides a sufficient union of the drive spindle 14 and base member 12 that upon continued rotation of cover member 80 about axis 54, platform 20 is likewise rotated about that axis. The rotation of platform 20 operates to turn the spindle controlling the fluid valve. When the hooks 98 are in a locked position with cross-bar 30, the user may rotate the cover member 80 in both a clockwise or counterclockwise direction and effect similar directioned rotations of the valve spindle.

In its locked configuration, the union of hooks 98 and cross-bars 30 may be substantially secure against a dislocating force application directed against the drive spindle from any direction, except the direction illustrated by arrow 133.

When the user wishes to return the assembly to the positioning shown in FIG. 2, the cover member is again depressed sufficiently to dislodge the legs 104 from slots 28b. Thereafter, the cover member is rotated clockwise sufficiently to align the entire length of hook 98 with slot 28a. Upon obtaining such an alignment, the cover member 80 is released and the spring 16 returns the drive spindle to the position shown in FIG. 2.

It will be appreciated that the invention provides a handle which requires a multi-step manual manipulation in order to activate the valve; i.e., a user must first depress the drive spindle 14 or its cover member 80 and thereafter align hooks 98 within slots 28 prior to being able to actuate the valve spindle by rotating base member 12. Further, after having positioned the hooks within slots 28 in a valve spindle actuatable orientation, the user may lock the handle into that orientation by positioning each hook about a respective cross-bar 30. The handle may thereafter remain locked about a force application to the drive spindle having a directional vector component along the direction indicated by arrow 133. Applying such a force, the handle may be disengaged to return to its initial, free-rotating orientation.

It should also be understood that upon the hooks 98 being initially inserted into slots 28a, the drive spindle 14 may be rotated and effect a rotation of platform 20 due to the abutment of hooks 98 against the walls 138 and cross-bars 30 of platform 20.

In other words, the drive spindle 14 may engage the platform 20 and rotate that platform without the hooks 98 being inserted into slots 28b. When the hooks 98 are only received into slots 28a, the release of a depressing force on the spindle 14 may result in the spindle being returned to the configuration shown in FIG. 2. Therefore, the instant invention includes a means of permitting the user to access the valve by either a locked or a temporary engagement of the drive spindle 14 with the platform 20.

The instant invention provides the user the benefits of a multi-step faucet together with the advantage of locking that faucet into a detachable engagement over a desired time period.

Those skilled in the art will recognize that the embodiments hereinbefore discussed are illustrative of the general principles of the invention. The embodiments herein described are not intended to limit the scope of the claims which themselves recite what applicant regards as his invention.

I claim:

1. A handle arrangement for a water faucet having a control valve which incorporates a spindle rotatably mounted to open said valve by rotation in a first direction and to close said valve by rotation in a second opposing direction, said handle arrangement comprising:
   a base member mounted on said spindle whereby a rotation of said base member rotates said spindle, said base defining at least one pair of slots therein;
   a spring member mounted on said base member and extending outwardly therefrom;
   a drive spindle rotatably supported and biased away from said base member by said spring member, said drive member having at least one hook-like grasping means affixed thereto, said grasping means being dimensioned and configured to be, inserted into at least one of said slots to form a releasable union therewith, wherein upon said grasping means being aligned with one of said slots, said drive member may be driven toward said base member thereby inserting said grasping means into at least one of said slots whereafter a rotation of said drive spindle aligns a portion of said grasping means in another slot of said slots forming a solid, yet detachable, union of said drive spindle and said base member for purposes of turning said base member by rotating said drive spindle.

2. The handle arrangement according to claim 1 wherein said base member includes a plurality of slots therein arranged about a substantially circular path on the surface of said base member.

3. The handle arrangement according to claim 2 wherein said base includes at least one pair of extensions mounted upright thereon, said extensions defining a channel dimensioned to slidably receive and retain a portion of said drive spindle.

4. The handle arrangement according to claim 3 wherein at least one of said extensions includes a first flange which extends outwardly therefrom and said drive spindle includes a second flange which extends outwardly therefrom, said first and second flanges adapted to mechanically cooperate to retain a portion of said drive spindle within said channel.

5. The handle arrangement according to claim 4 wherein said drive spindle includes a lip member mounted upright thereon adapted to receive and retain said spring member in a position on said drive spindle.

6. The handle arrangement according to claim 5 wherein a cover member is mounted detachably removable on said drive spindle, said cover member configured to be grasped and manipulated by a user.

7. The handle arrangement according to claim 1 wherein said base member is detachably mounted to said valve spindle.

8. A handle arrangement for a water faucet having a control valve which incorporates a spindle rotatably mounted to open said valve by rotation in a first direction and to close said valve by rotation in a second opposite direction, said handle arrangement comprising;
   a connection means for connecting said handle arrangement to said spindle, said connection means defining a retention member;
   driving means for mechanically cooperating with said connection means to turn said spindle, said driving means including grasping means for receiving and retaining said retention means to form a mechanical union;
   spring means interconnecting said driving means with said connection means, said spring means biasing said driving means away from said connection means;
   securement means for mechanically relating said connection means and said driving means, said securement means exerting force on said driving means in opposition to said spring means whereby said drive means is retained in mechanical association with said connection means;
   wherein said mechanical union of said retention member and said grasping means resists forces directed thereagainst in all but one direction and exerts a force against said drive means directed opposite that of said spring means.

9. A handle arrangement for use with a water faucet having a valve fitted with a spindle which rotates in a first direction to open the valve and rotates in a second opposing direction to close the valve, said handle arrangement comprising:
   a base member comprising:
      a first disc-like panel defining a plurality of slots therein arranged about a generally circular path, each of said slots having a cross-bar associated therewith,
      a clip mounted upright on said disc-like panel, said clip having a first flange which extends outwardly therefrom, an extension mounted upright on said disc-like panel and substantially circumscribed by said clip, an association of said clip and said extension defining a channel therebetween, said extension having a female threaded socket therein;

a threaded bolt, dimensioned to mechanically cooperate with said socket, said bolt adapted to mechanically cooperate with said spindle to form a manually detachable union;

a drive spindle comprising:
- a second disc-like panel,
- an annular lip mounted upright on said second disc-like panel,
- an annular shaft mounted upright on said second disc-like panel, said shaft being circumscribed by said lip, a portion of said shaft being reciprocably mounted within said channel,
- a second flange mounted upright on said shaft, said second flange being mechanically cooperative with said first flange to retain said portion of said shaft in said channel,
- a plurality of hooks mounted on said shaft, each of said hooks being dimensioned to be individually insertable within a respected slot so as to grasp and detachably retain a respective said slot crossbar;

a coil spring having a first end and a second end, said first end being mounted about said first annular clip and abutting against said first disc-like panel, said second end being mounted about said lip and abutting against said second disc panel, whereby said spring exerts a force against said drive spindle directed to remove said shaft from said channel.

10. A handle arrangement for a water faucet having a control valve which incorporates a spindle rotatably mounted to open said valve by rotation in a first direction and to close said valve by rotation in a second opposite direction, said handle arrangement comprising;

a connection means for connecting said handle arrangement to said spindle, said connection means defining a retention member;

driving means for mechanically cooperating with said connection means to turn said spindle, said driving means including grasping means for receiving and retaining said retention member to form a mechanical union;

spring means interconnecting said driving means with said connection means, said spring means biasing said driving means away from said connection means;

wherein said mechanical union of said retention member and said grasping means resists forces directed thereagainst in all but one direction and exerts a force against said drive means directed opposite that of said spring means.

* * * * *